US006950970B2

(12) United States Patent
Mishima (10) Patent No.: US 6,950,970 B2
(45) Date of Patent: Sep. 27, 2005

(54) OPERATION REPORT CREATION SYSTEM, OPERATION REPORT CREATION METHOD, AND OPERATION REPORT CREATION PROGRAM

(75) Inventor: Kuniyoshi Mishima, Tokyo (JP)

(73) Assignee: NEC Corporation, Tokyo (JP)

( * ) Notice: Subject to any disclaimer, the term of this patent is extended or adjusted under 35 U.S.C. 154(b) by 448 days.

(21) Appl. No.: 10/076,332

(22) Filed: Feb. 19, 2002

(65) Prior Publication Data

US 2002/0194522 A1 Dec. 19, 2002

(30) Foreign Application Priority Data

Mar. 1, 2001 (JP) ...................................... 2001-056317

(51) Int. Cl.[7] .............................................. G06F 11/00
(52) U.S. Cl. ....................................................... 714/47
(58) Field of Search ..................... 714/47, 33; 702/182, 702/186, 187

(56) References Cited

U.S. PATENT DOCUMENTS

| 6,154,857 | A  | * | 11/2000 | Mann ............................ 714/30 |
| 6,434,714 | B1 | * | 8/2002  | Lewis et al. ................... 714/38 |
| 6,493,655 | B1 | * | 12/2002 | Fuse ............................ 702/186 |
| 6,564,175 | B1 | * | 5/2003  | Hady et al. .................. 702/186 |
| 6,711,526 | B2 | * | 3/2004  | Cooper ........................ 702/186 |
| 6,754,612 | B1 | * | 6/2004  | Vanfladern et al. .......... 702/186 |

OTHER PUBLICATIONS

Foster, Ian T., Designing and Building Parallel Programs, 1995, Addison–Wesley Publishing Company, pp. 315–319 and 323.*

* cited by examiner

*Primary Examiner*—Robert Beausoliel
*Assistant Examiner*—Marc Duncan
(74) *Attorney, Agent, or Firm*—Young & Thompson (57) ABSTRACT

An operation report creation system comprises CPU operation status obtaining means for obtaining, at a regular interval, an execution address at which a CPU is performing execution and for checking and recording a program identifier of a program in execution from the obtained execution address; CPU operation time obtaining means for obtaining an operation time of the CPU during an operation period; and operation report creation means for obtaining a total number of program identifiers, recorded by the CPU operation status obtaining means, for a predetermined period for each program identifier or each group of a plurality of predetermined program identifiers and for outputting a value, obtained by multiplying a ratio of the total number of program identifiers for each program identifier or each group of the plurality of predetermined program identifiers to a total number of program identifiers recorded by the CPU operation status obtaining means for the predetermined period and the CPU operation time obtained by the CPU operation time obtaining means, as a CPU operation time required for execution of a program corresponding to the program identifier or of a program group corresponding to the plurality of predetermined program identifiers.

6 Claims, 9 Drawing Sheets

OPERATION REPORT CREATION SYSTEM, OPERATION REPORT CREATION METHOD, AND OPERATION REPORT CREATION PROGRAM

BACKGROUND OF THE INVENTION

1. Field of the Invention

The present invention relates to an operation report creation system, an operation report creation method, and an operation report creation program, and more particularly to an operation report creation system, an operation report creation method, and an operation report creation program that allow the user to create reports effectively.

2. Description of the Related Art

Figure 10:
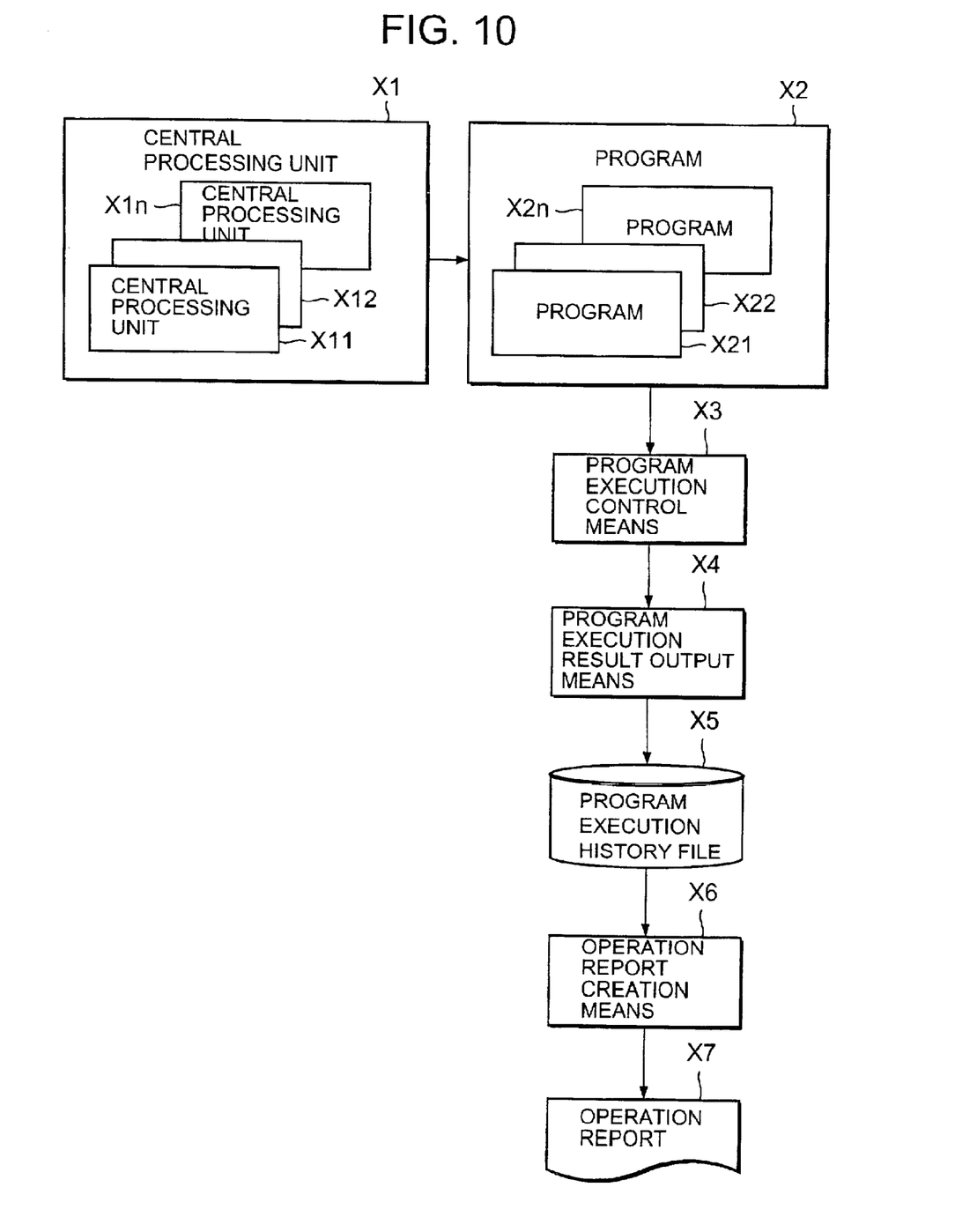
FIG. 10 is a block diagram showing the configuration of a conventional technology.

As shown in FIG. 10, a conventional operation report creation system comprises a central processing unit X1 that operates under program control, a program X2 that is executed by the central processing unit, program execution control means X3, program execution result output means X4, program execution history file X5, operation report creation means X6, and an operation report X7.

The conventional operation report creation system with the configuration described above operates as described below.

That is, the program execution control means X3 controls the start and end of the execution of each program X2. When the program ends, the program execution result output means X4 writes the CPU time used by the program to the program execution history file X5.

After that, when creating an operation report, the operation report creation means X6 reads information from the program execution history file X5 and outputs the CPU occupation time to the operation report X7.

However, the conventional technology described above has the following problems:

First, when the totaling period of an operation report is long or when there are a large number of programs for which totals must be calculated, a large amount of history information is used to calculate the total. This is because the CPU occupation times of all programs that run during the operation period must be totaled.

Second, an operation report does not include information on the programs that constantly run during system operation. This is because an operation report is created using execution information produced at the end of program execution and, therefore, execution information cannot be totaled before the program ends.

Third, changing the total unit of an operation report requires modifications to the operating system that controls programs for the totals are to be calculated. This is because operation report source information is closely related with the control of the operating system under which programs are executed or execution results are output.

SUMMARY AND OBJECTS OF THE INVENTION

It is an object of the present invention to provide an operation report creation system that does not require a large amount of history information for calculating a total even when the totaling period of the operation report is long or when there are a large number of programs for which totals must be calculated and that can total execution information on constantly-running programs.

A first operation report creation system according to the present invention comprises CPU operation status obtaining means for obtaining, at a regular interval, an execution address at which a CPU is performing execution and for checking and recording a program identifier of a program in execution from the obtained execution address; CPU operation time obtaining means for obtaining an operation time of the CPU during an operation period; and operation report creation means for obtaining a total number of program identifiers, recorded by the CPU operation status obtaining means, for a predetermined period for each program identifier or each group of a plurality of predetermined program identifiers and for outputting a value, obtained by multiplying a ratio of the total number of program identifiers for each program identifier or each group of the plurality of predetermined program identifiers to a total number of program identifiers recorded by the CPU operation status obtaining means for the predetermined period and the CPU operation time obtained by the CPU operation time obtaining means, as a CPU operation time required for execution of a program corresponding to the program identifier or of a program group corresponding to the plurality of predetermined program identifiers.

A second operation report creation system according to the present invention is the first operation report creation system, wherein the CPU operation status obtaining means records a CPU operation status history record into a CPU operation status history file, the record being composed of at least the program identifier of the program and a time interval between a time a previous execution address was obtained and a time a current execution address is obtained, wherein the CPU operation time obtaining means obtains, at a regular interval, an operation time of the CPU during the time interval and records a CPU operation time history record into a CPU operation time history file, the record being composed of at least the operation time of the CPU, and wherein the operation report creation means reads the CPU operation time history record stored in the CPU operation time history file, cumulates the operation time of the CPU included in the CPU operation time history record to calculate the operation time of the CPU during the operation period, reads the CPU operation status history record stored in the CPU operation status history file, cumulates the time interval included in the CPU operation status history record for each program identifier or each group of the plurality of predetermined program identifiers, and outputs a value, obtained by multiplying a ratio of the time interval cumulated for each program identifier or each group of the plurality of predetermined program identifiers to a total of the time intervals recorded by the CPU operation status obtaining means during the predetermined period and the operation time of the CPU during the operation period, as a CPU operation time required for execution of a program corresponding to the program identifier or to a program group corresponding to the plurality of predetermined program identifiers.

A third operation report creation system according to the present invention is the second operation report creation system, further comprising a conversion table that indicates a relation between a total identifier which is a total unit for cumulating the time intervals and the program identifier; and conversion table updating means for updating the conversion table, wherein the operation report creation means cumulates the time interval for each total identifier stored in the conversion table.

A first operation report creation method according to the present invention comprises a CPU operation status obtaining step for obtaining at a regular interval, by a computer, an execution address at which a CPU is performing execution and for checking and recording a program identifier of a program in execution from the obtained execution address; a CPU operation time obtaining step for obtaining, by the computer, an operation time of the CPU during an operation period; and an operation report creation step for obtaining, by the computer, a total number of program identifiers, recorded by the CPU operation status obtaining step, for a predetermined period for each program identifier or each group of a plurality of predetermined program identifiers and for outputting a value, obtained by multiplying a ratio of the total number of program identifiers for each program identifier or each group of the plurality of predetermined program identifiers to a total number of program identifiers recorded by the CPU operation status obtaining step for the predetermined period and the CPU operation time obtained by the CPU operation time obtaining step, as a CPU operation time required for execution of a program corresponding to the program identifier or of a program group corresponding to the plurality of predetermined program identifiers.

A second operation report creation method according to the present invention is the first operation report creation method, wherein the CPU operation status obtaining step records a CPU operation status history record into a CPU operation status history file, the record being composed of at least the program identifier of the program and a time interval between a time a previous execution address was obtained and a time a current execution address is obtained, wherein the CPU operation time obtaining step obtains, at a regular interval, an operation time of the CPU during the time interval and records a CPU operation time history record into a CPU operation time history file, the record being composed of at least the operation time of the CPU, and wherein the operation report creation step reads the CPU operation time history record stored in the CPU operation time history file, cumulates the operation time of the CPU included in the CPU operation time history record to calculate the operation time of the CPU during the operation period, reads the CPU operation status history record stored in the CPU operation status history file, cumulates the time interval included in the CPU operation status history record for each program identifier or each group of the plurality of predetermined program identifiers, and outputs a value, obtained by multiplying a ratio of the time interval cumulated for each program identifier or each group of the plurality of predetermined program identifiers to a total of the time intervals recorded by the CPU operation status obtaining step during the predetermined period and the operation time of the CPU during the operation period, as a CPU operation time required for execution of a program corresponding to the program identifier or to a program group corresponding to the plurality of predetermined program identifiers.

A third operation report creation method according to the present invention is the second operation report creation method, further comprising a conversion table updating step for updating, by the computer, a conversion table that indicates a relation between a total identifier which is a total unit for cumulating the time intervals and the program identifier, wherein the operation report creation step cumulates the time interval for each total identifier stored in the conversion table.

A first program according to the present invention causes a computer to execute a CPU operation status obtaining process for obtaining, at a regular interval, an execution address at which a CPU is performing execution and for checking and recording a program identifier of a program in execution from the obtained execution address; a CPU operation time obtaining process for obtaining an operation time of the CPU during an operation period; and an operation report creation process for obtaining a total number of program identifiers, recorded by the CPU operation status obtaining process, for a predetermined period for each program identifier or each group of a plurality of predetermined program identifiers and for outputting a value, obtained by multiplying a ratio of the total number of program identifiers for each program identifier or each group of the plurality of predetermined program identifiers to a total number of program identifiers recorded by the CPU operation status obtaining process for the predetermined period and the CPU operation time obtained by the CPU operation time obtaining process, as a CPU operation time required for execution of a program corresponding to the program identifier or of a program group corresponding to the plurality of predetermined program identifiers.

A second program according to the present invention is the first program, wherein the CPU operation status obtaining process records a CPU operation status history record into a CPU operation status history file, the record being composed of at least the program identifier of the program and a time interval between a time a previous execution address was obtained and a time a current execution address is obtained, wherein the CPU operation time obtaining process obtains, at a regular interval, an operation time of the CPU during the time interval and records a CPU operation time history record into a CPU operation time history file, the record being composed of at least the operation time of the CPU, and wherein the operation report creation process reads the CPU operation time history record stored in the CPU operation time history file, cumulates the operation time of the CPU included in the CPU operation time history record to calculate the operation time of the CPU during the operation period, reads the CPU operation status history record stored in the CPU operation status history file, cumulates the time interval included in the CPU operation status history record for each program identifier or each group of the plurality of predetermined program identifiers, and outputs a value, obtained by multiplying a ratio of the time interval cumulated for each program identifier or each group of the plurality of predetermined program identifiers to a total of the time intervals recorded by the CPU operation status obtaining process during the predetermined period and the operation time of the CPU during the operation period, as a CPU operation time required for execution of a program corresponding to the program identifier or to a program group corresponding to the plurality of predetermined program identifiers.

A third program according to the present invention is the second program, further comprising a conversion table updating process for updating a conversion table that indicates a relation between a total identifier which is a total unit for cumulating the time intervals and the program identifier, wherein the operation report creation process cumulates the time interval for each total identifier stored in the conversion table.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENTS

Next, the present invention will be described in detail by referring to the attached drawings.

First, a first embodiment of the present invention will be described in detail below.

Figure 1:
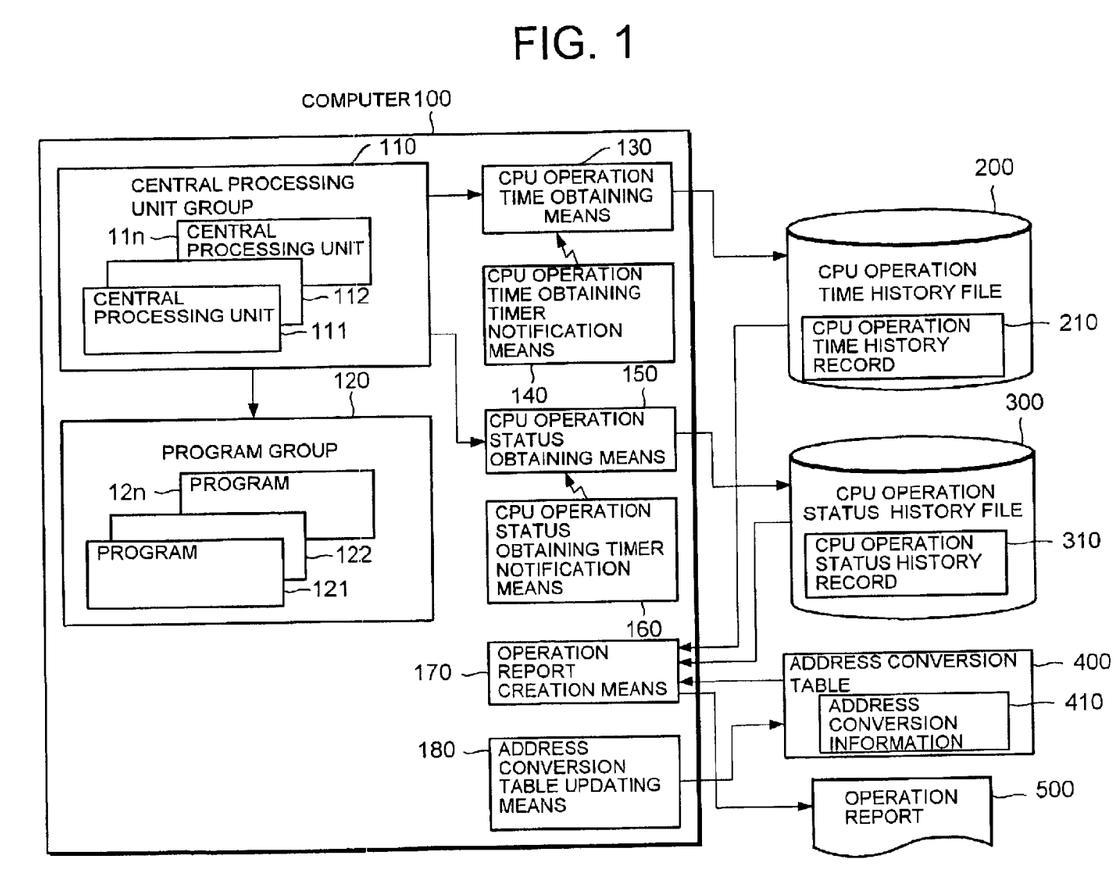
FIG. 1 is a block diagram showing the configuration of a first embodiment of the present invention.

Referring to FIG. 1, the first embodiment of the present invention comprises a computer 100, a CPU operation time history file 200, a CPU operation status history file 300, an address conversion table 400, and an operation report 500. The computer 100 operates under program control.

The computer 100 comprises a central processing unit group 110, a program group 120 composed of programs to be executed the central processing units, CPU operation time obtaining means 130, CPU operation time obtaining timer notification means 140, CPU operation status obtaining means 150, CPU operation status obtaining timer notification means 160, operation report creation means 170, and address conversion table updating means 180.

The central processing unit group 110 comprises a central processing unit 111 and a central processing unit 112. A central processing unit 11n means one or more central processing units that are a third and following central processing units.

The program group 120 comprises a program 121 and a program 122. A program 12n means one or more programs that are a third and following programs.

The CPU operation time history file 200 includes CPU operation time history records 210 obtained at a regular interval throughout the operation period.

The CPU operation status history file 300 includes CPU operation status history records 310 obtained at a regular interval during a part of the operation period.

The address conversion table 400 includes multiple units of address conversion information 410.

The operation of the means included in the computer will be outlined below.

The CPU operation time obtaining timer notification means 140 starts the CPU operation time obtaining means 130 at a regular time interval.

The CPU operation status obtaining timer notification means 160 starts the CPU operation status obtaining means 150 at a regular time interval.

In response to a notification from the CPU operation time obtaining timer notification means 140, the CPU operation time obtaining means 130 obtains, from each of the central processing units 111, 112, . . . , 11n in the central processing unit group 110, the length of time (CPU operation time) during which the CPU was in operation between the time the previous information was obtained and the time the current information is obtained and records the obtained time as the CPU operation time history record 210 into the CPU operation time history file 200.

In response to a notification from the CPU operation status obtaining timer notification means 160, the CPU operation status obtaining means 150 obtains, from each of the central processing units 111, 112, . . . , 11n in the central processing unit group 110, the information on a program being processed at this point of time and records the obtained information as the CPU operation status history record 310 into the CPU operation status history file 300.

The operation report creation means 170 creates the operation report 500 from the CPU operation time history record 210 stored in the CPU operation time history file 200, the CPU operation status history record 310 stored in the CPU operation status history file 300, and the address conversion information 410 stored in the address conversion table 400.

The address conversion table updating means 180 updates the address conversion information 410 stored in the address conversion table 400.

Figure 2:
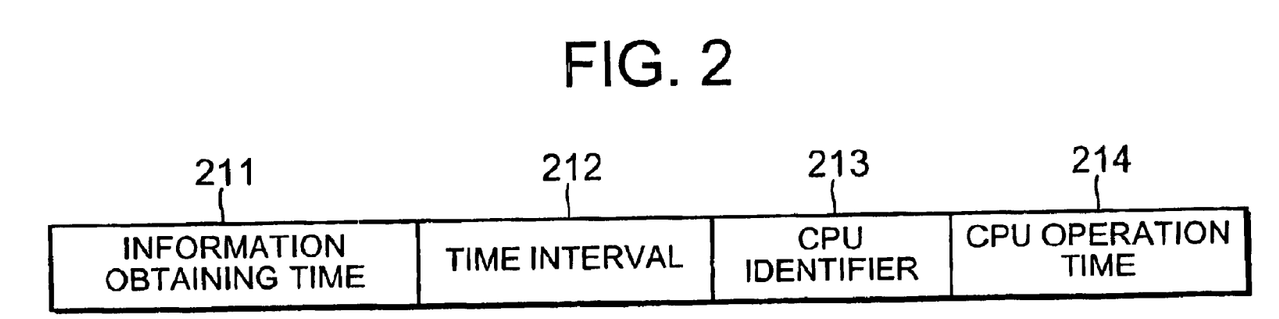
FIG. 2 is a diagram showing an example of a CPU operation time history record in the first embodiment of the present invention.

Referring to FIG. 2, the CPU operation time history record 210 is composed of an information obtaining time 211 at which the information of this record was obtained, a time interval 212 that is the difference between the previous information obtaining time and the current information obtaining time, a CPU identifier 213 that uniquely identifies the CPU in the computer system, and an operation time 214 during which the CPU was in operation between the previous information obtaining time and the current information obtaining time.

Figure 3:
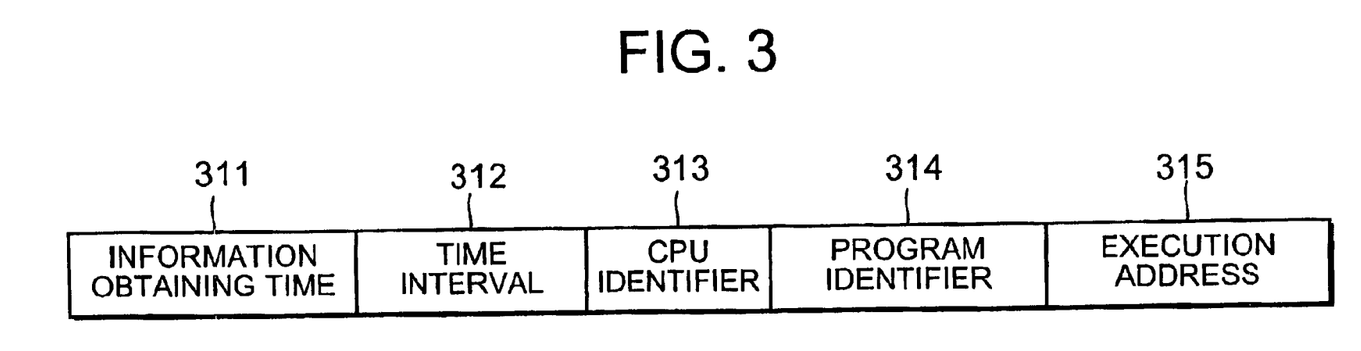
FIG. 3 is a diagram showing an example of a CPU operation status history record in the first embodiment of the present invention.

Referring to FIG. 3, the CPU operation status history record 310 is composed of an information obtaining time 311 at which the information of this record was obtained, a time interval 312 that is the difference between the previous information obtaining time and the current information obtaining time, a CPU identifier 313 that uniquely identifies the CPU in the computer system, a program identifier 314 that identifies the program that was being executed if the CPU was in operation when this record was obtained, and an execution address 315 that indicates an address at which the operation was executed.

Figure 4:
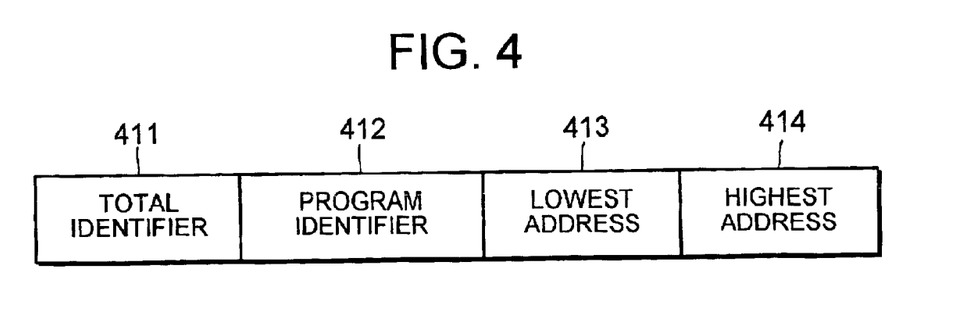
FIG. 4 is a diagram showing an example of address conversion information in the first embodiment of the present invention.

Referring to FIG. 4, the address conversion information 410 is composed of a total identifier 411 that identifies a unit of total, a program identifier 412 that corresponds to the total identifier, a lowest address 413, and a highest address 414.

Next, referring to FIGS. 1–9, the general operation of this embodiment will be described in detail.

First, in FIG. 1, the CPU operation time obtaining timer notification means 140 starts the CPU operation time obtaining means 130 at a regular interval.

Figure 5:
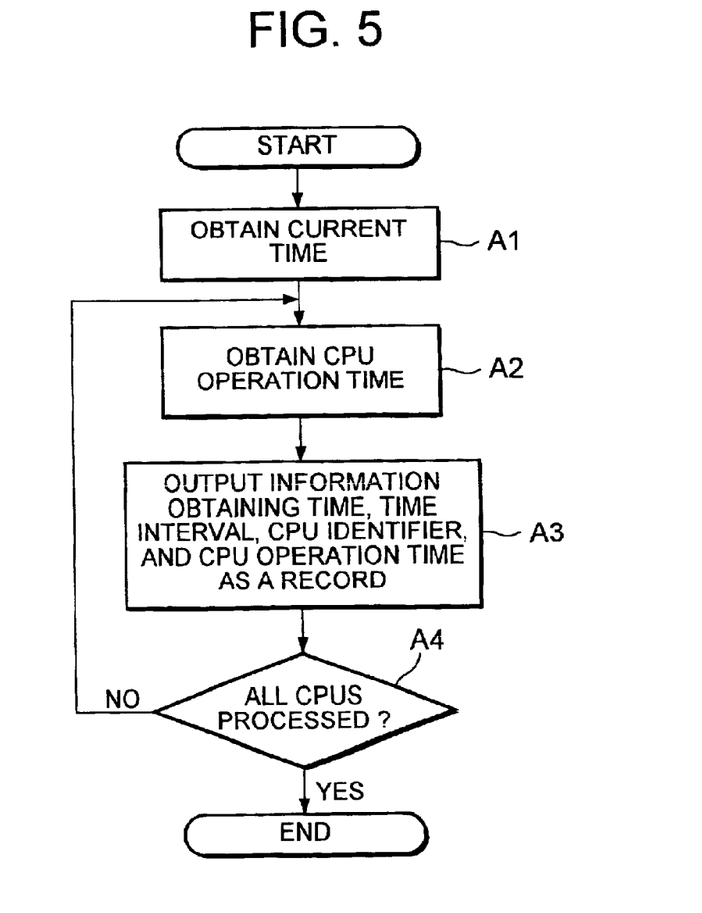
FIG. 5 is a flowchart showing the operation of the first embodiment of the present invention.

The CPU operation time obtaining means 130 obtains the current time (step A1 in FIG. 5). After that, the CPU operation time obtaining means 130 obtains the CPU operation time from the central processing unit 111 (step A2 in FIG. 5). This CPU operation time is the length of time during which the CPU was in operation between the time the pervious information was obtained and the time the current information is obtained. The obtained information is written into the CPU operation time history file 200 as the CPU operation time history record 210 (step A3 in FIG. 5). The same processing is performed for the central processing units 112, . . . , 11*n* (step A4 in FIG. 5). Note that the CPU operation time obtaining timer notification means 140 starts the CPU operation time obtaining means 130 at a regular interval throughout the operation period.

Figure 6:
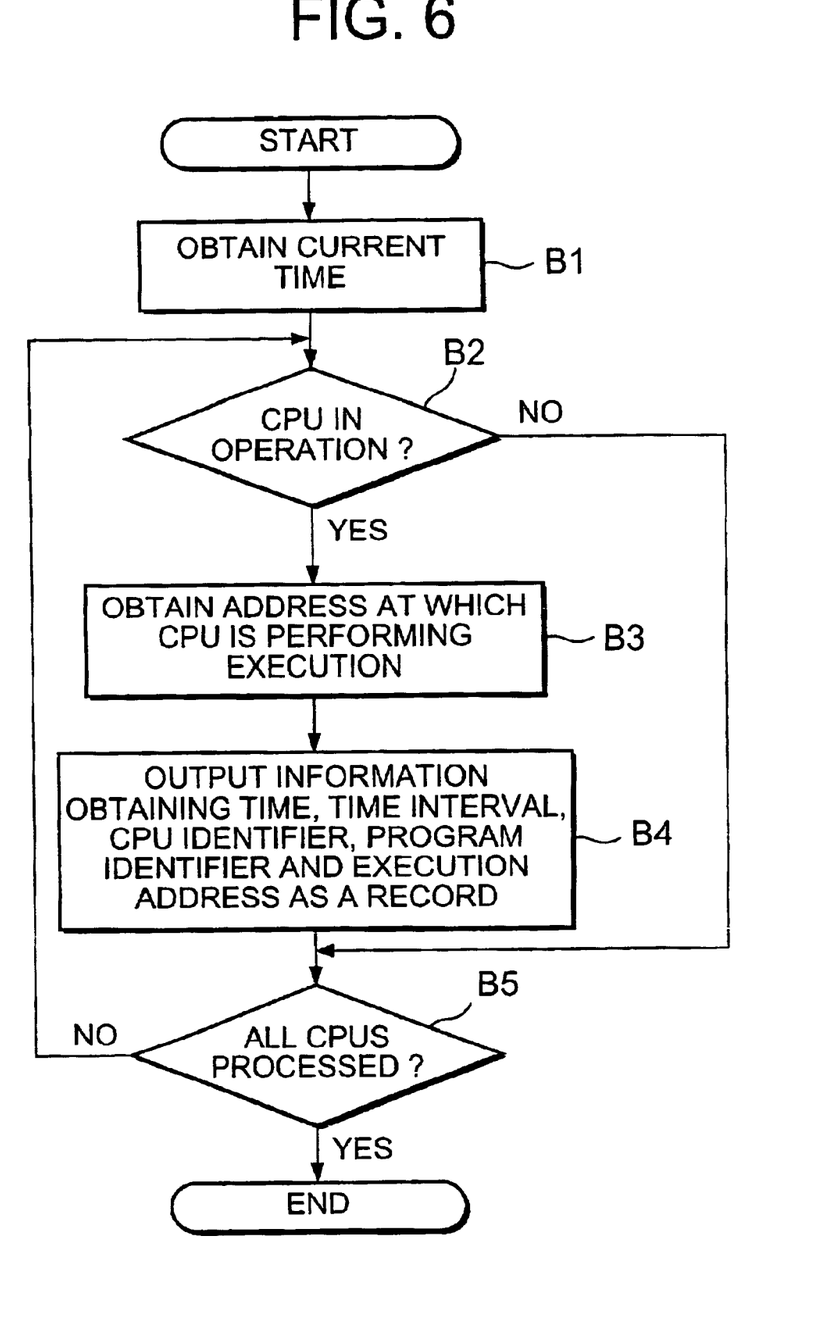
FIG. 6 is a flowchart showing the operation of the first embodiment of the present invention.

Next, the CPU operation status obtaining timer notification means 160 starts the CPU operation status obtaining means 150 at a regular interval.

The CPU operation status obtaining means 150 obtains the current time (step B1 in FIG. 6). After that, the CPU operation status obtaining means 150 checks if the central processing unit 111 is in operation (step B2 in FIG. 6) and, if it is in operation, obtains from the central processing unit 111 the address at which execution is being performed (step B3 in FIG. 6) and, at the same time, checks this address to find what program, that is, a program with what program identifier, is being executed and writes the obtained information into the CPU operation status history file 300 as the CPU operation status history record 310 (step B4 in FIG. 6). The same processing is performed for the central processing units 112, . . . , 11*n* (step B5 in FIG. 6). The CPU operation status obtaining timer notification means 160 starts the, CPU operation status obtaining means 150 at a regular interval during a part of the operation period that is sampled.

Figure 7:
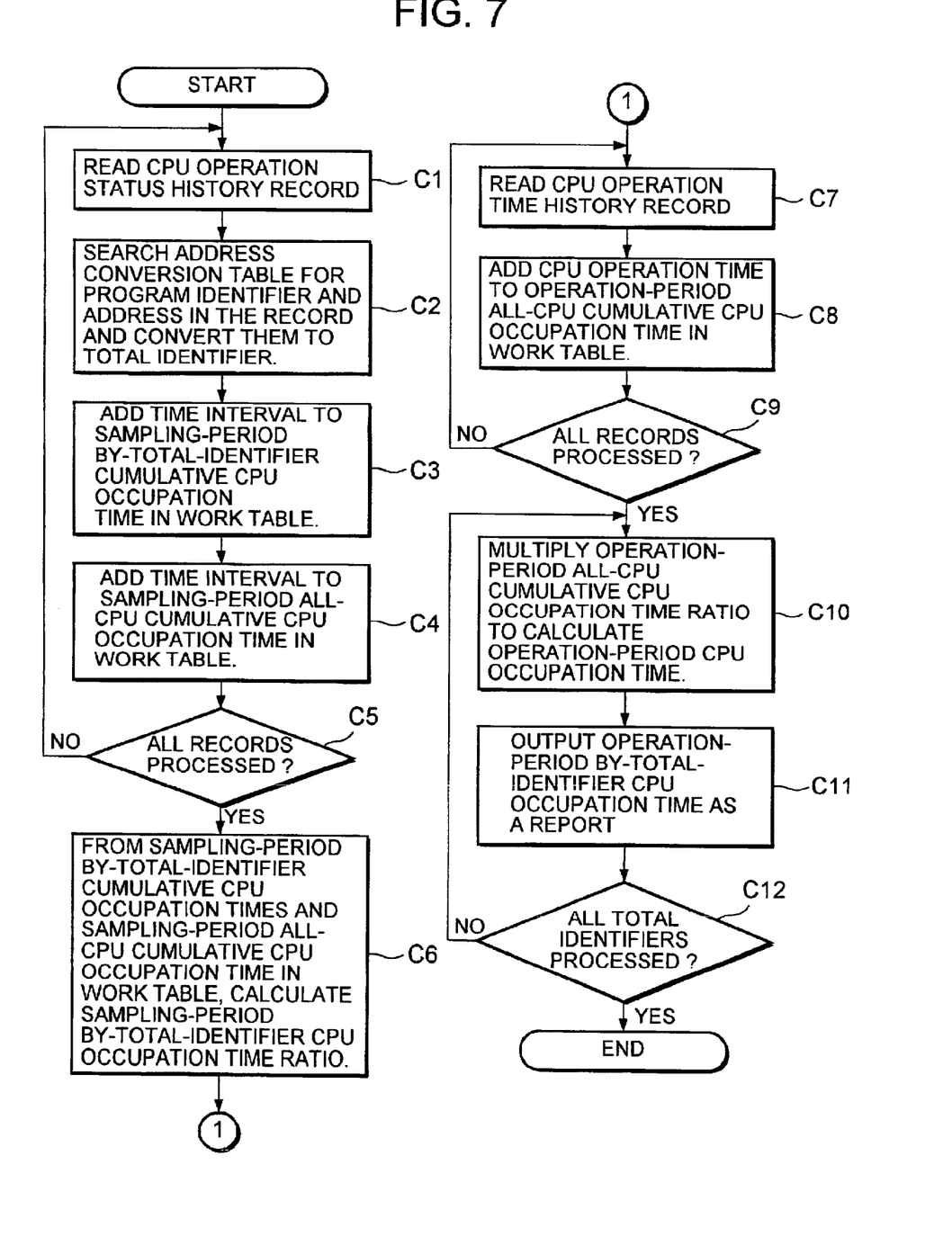
FIG. 7 is a flowchart showing the operation of the first embodiment of the present invention.

Next, the operation report creation means 170 sequentially reads CPU operation status history record 310 from the CPU operation status history file 300 (step C1 in FIG. 7). The operation report creation means 170 searches the address conversion information 410 in the address conversion table 400 for the total identifier with the program identifier and the execution address, included in the record that was read, as the key (step C2 in FIG. 7). Then, the time interval included in the record that was read is added to the sampling-period by-total-identifier cumulative CPU occupation time in the work table prepared for the total identifier (step C3 in FIG. 7). In addition, the time interval included in the record that was read is added to the sampling-period all-CPU cumulative CPU occupation time in the work table (step C4 in FIG. 7). Similarly, all remaining CPU operation status history records 310 are read and processed (step C5 in FIG. 7). Then, from the sampling-period by-total-identifier cumulative CPU occupation times and the sampling-period all-CPU cumulative CPU occupation time in the work table that has been completed, the sampling-period by-total-identifier CPU occupation time ratio is calculated (step C6 in FIG. 7). After that, the CPU operation time history record 210 is read sequentially from the CPU operation time history file 200 (step C7 in FIG. 7) and the CPU operation time in the record that was read is added to the operation-period all-CPU cumulative CPU occupation time in the work table (step C8 in FIG. 7). Similarly, all remaining CPU operation time history records 210 are read and processed (step C9 in FIG. 7). Finally, the operation-period all-CPU cumulative CPU occupation time and the sampling-period by-total-identifier CPU occupation time ratio are multiplied to calculate the operation-period by-total-identifier CPU occupation time (step C10 in FIG. 7). The operation-period by-total-identifier CPU occupation time is output as a report (step C11 in FIG. 7). Similarly, the above calculation and the report output operation are performed for all remaining total identifiers (step C12 in FIG. 7).

On the other hand, the address conversion table updating means 180 is able to update the address conversion information 410 in the address conversion table 400 to change the total unit of the operation report 500.

Next, an example will be described.

Figure 8:
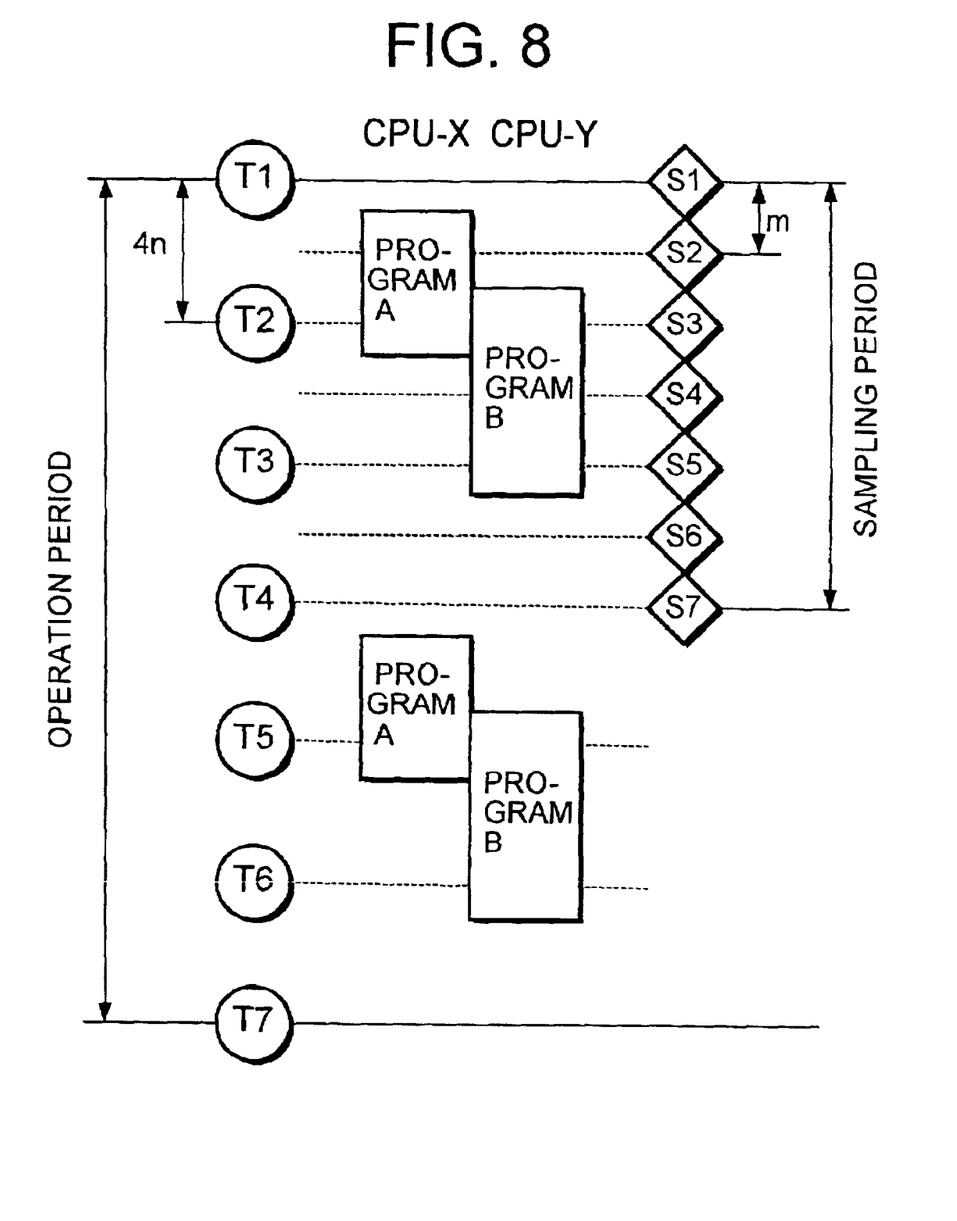
FIG. 8 is a diagram showing an example of the first embodiment of the present invention.
Figure 9:
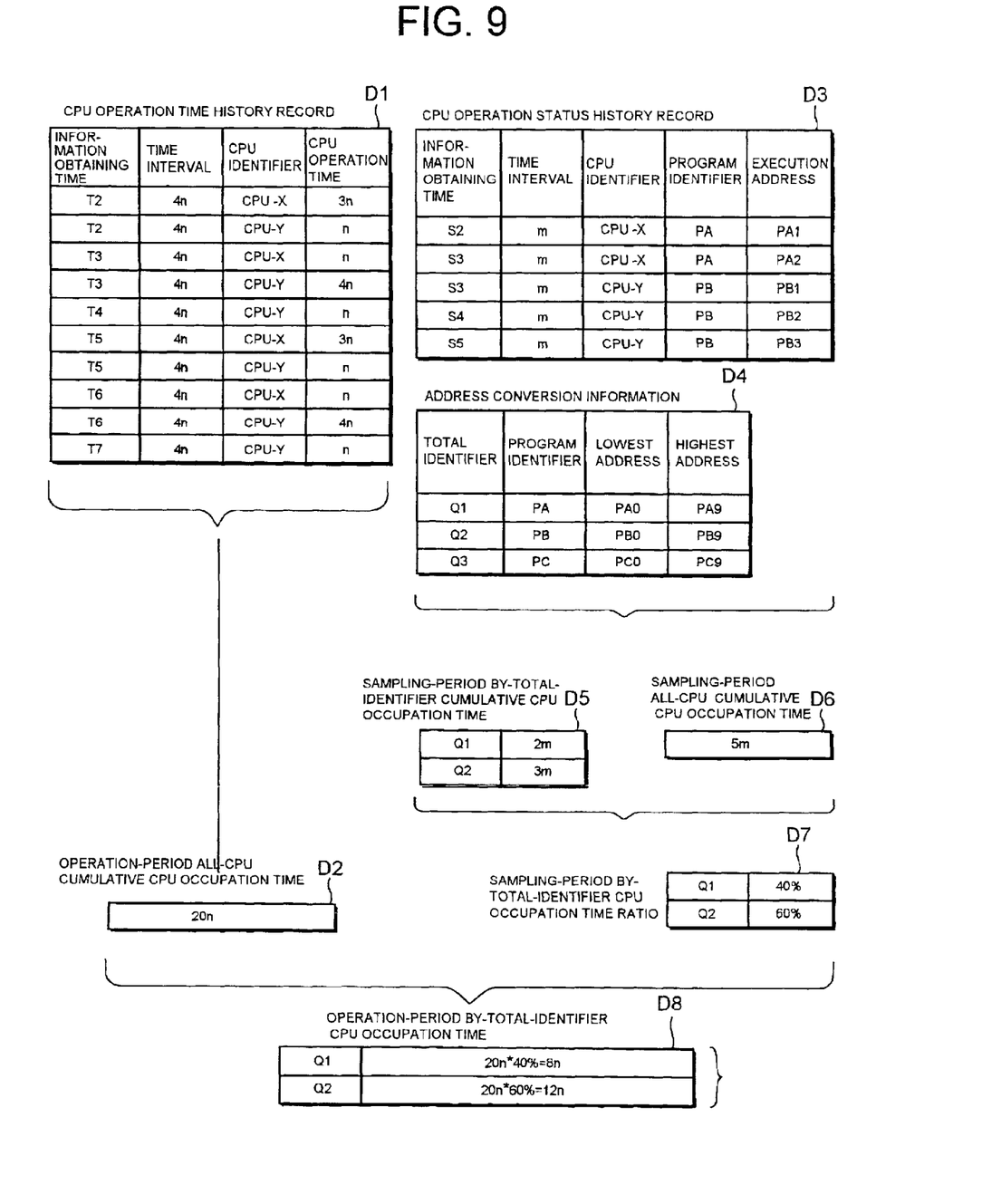
FIG. 9 is a diagram showing an example of the first embodiment of the present invention.

When the operation-period CPU occupation time is calculated for each total unit in the computer 100 having the central processing unit group 110 composed of two central processing units as shown in FIGS. 8 and 9, the CPU operation time obtaining timer notification means 140 starts the CPU operation time obtaining means 130 at an interval of 4*n* throughout the operation period (T1 to T7 in FIG. 8) The CPU operation time obtaining means obtains the operation time of each CPU and writes the CPU operation time history record 210 (D1 in FIG. 9).

On the other hand, the CPU operation status obtaining timer notification means 160 starts the CPU operation status obtaining means 150 at an interval of m throughout a sampling period (S1 to S7 in FIG. 8) which is shorter than the operation period. The CPU operation status obtaining means 150 obtains information on the address at which each CPU is performing processing and writes the CPU operation status history record 310 (D3 in FIG. 9).

As a result, the operation report creation means 170 calculates the operation-period all-CPU cumulative CPU occupation time (D2 in FIG. 9) from the CPU operation time history records 210 (D1 in FIG. 9) and calculates the sampling-period by-total-identifier cumulative CPU occupation times (D5 in FIG. 9) and the sampling-period all-CPU cumulative CPU occupation time (D6 in FIG. 9) from the CPU operation status history records (D3 in FIG. 9) and the address conversion information (D4 in FIG. 9) to calculate the sampling-period by-total-identifier CPU occupation time ratio (D7 in FIG. 9). As a result, the CPU occupation time report (D8 in FIG. 9) is created from the operation-period all-CPU cumulative CPU occupation time (D2 in FIG. 9) and the sampling-period by-total-identifier CPU occupation time ratio (D7 in FIG. 9).

Next, a second embodiment of the present invention will be described with reference to the drawings.

The second embodiment of the present invention has an operation report creation program. The operation report creation program controls the operation of the computer 100 to cause the computer 100 to execute the means described above, that is, the same means as those in the first embodiment.

As described above, the present invention provides the following advantages:

First, even when the totaling time of an operation report is long or when the totals of a large number of programs must be calculated, the equivalent information may be obtained through a short-period sampling without having to calculate a huge amount of total information on the CPU occupation times of all programs throughout a very long operation time. This is because the CPU occupation time during the operation period may be estimated for each total unit from the CPU operation time during the operation period and the CPU operation status during a sampling period.

Second, the total of the CPU occupation time may be calculated even for a constantly running program even if such a program runs during system operation. This is because the total of the CPU occupation time is calculated based on the information obtained during a sampling period, not on the execution information produced at the end of the program.

Third, the system may be applied without adding modifications to programs whose totals are to be calculated or to the operating system that controls execution. This is because the system monitors the CPU operation time and the operation status externally.

Fourth, a total may be calculated from various aspects, for example, on a functional basis or on a product basis. This is because the information in the address conversion table, which is used to create a CPU occupation time report, may be changed to information for use in calculating a total on a basis of any unit the user desires.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. An operation report creation system comprising:

CPU operation status obtaining means for obtaining, at a regular operation-status interval, an execution address at which a CPU is performing execution and for checking and recording a program identifier of a program in execution from the obtained execution address;

CPU operation time obtaining means for obtaining an operation time of the CPU during an operation period; and operation report creation means outputting a value, obtained by multiplying a ratio of the total number of program identifiers for each program identifier or each group of the plurality of predetermined program identifiers to a total number of program identifiers recorded by said CPU operation status obtaining means for the predetermined period and the CPU operation time obtained by said CPU operation time obtaining means, as a CPU operation time required for execution of a program corresponding to the program identifier or of a program group corresponding to the plurality of predetermined program identifiers;

wherein said CPU operation status obtaining means records a CPU operation status history record into a CPU operation status history file, said record being composed of at least the program identifier of the program and the operation-status interval between a time a previous execution address was obtained and a time a current execution address is obtained, wherein said CPU operation time obtaining means obtains, at a regular operation-time interval, an operation time of the CPU during the operation-time interval and records a CPU operation time history record into a CPU operation time history file, said record being composed of at least the operation time of the CPU, and wherein said operation report creation means reads the CPU operation time history record stored in said CPU operation time history file, cumulates the operation time of the CPU included in the CPU operation time history record to calculate the operation time of the CPU during the operation period, reads the CPU operation status history record stored in said CPU operation status history file, cumulates the operation-status intervals included in the CPU operation status history record for each program identifier or each group of the plurality of predetermined program identifiers, and outputs a value, obtained by multiplying a ratio of the operation-status interval cumulated for each program identifier or each group of the plurality of predetermined program identifiers to a total of the operation-status intervals recorded by said CPU operation status obtaining means during the predetermined period and the operation time of the CPU during the operation period, as a CPU operation time required for execution of a program corresponding to the program identifier or to a program group corresponding to the plurality of predetermined program identifiers.

2. The operation report creation system according to claim 1, further comprising:

a conversion table that indicates a relation between a total identifier which is a total unit for cumulating the operation-status intervals and the program identifier; and conversion table updating means for updating the conversion table, wherein said operation report creation means cumulates the operation-status interval for each total identifier stored in said conversion table.

3. An operation report creation method comprising:

a CPU operation status obtaining step for obtaining at a regular operation-status interval, by a computer, an execution address at which a CPU is performing execution and for checking and recording a program identifier of a program in execution from the obtained execution address;

a CPU operation time obtaining step for obtaining, by said computer, an operation time of the CPU during an operation period; and an operation report creation step for outputting a value, obtained by multiplying a ratio of the total number of program identifiers for each program identifier or each group of the plurality of predetermined program identifiers to a total number of program identifiers recorded by said CPU operation status obtaining step for the predetermined period and the CPU operation time obtained by said CPU operation time obtaining step, as a CPU operation time required for execution of a program corresponding to the program identifier or of a program group corresponding to the plurality of predetermined program identifiers;

wherein said CPU operation status obtaining step records a CPU operation status history record into a CPU operation status history file, said record being composed of at least the program identifier of the program and the operation-status interval between a time a previous execution address was obtained and a time a current execution address is obtained, wherein said CPU operation time obtaining step obtains, at a regular operation-time interval, an operation time of the CPU during the operation-time interval and records a CPU operation time history record into a CPU operation time history file, said record being composed of at least the operation time of the CPU, and wherein said operation report creation step reads the CPU operation time history record stored in said CPU operation time history file, cumulates the operation time of the CPU included in the CPU operation time history record to calculate the operation time of the CPU during the operation period, reads the CPU operation status history record stored in said CPU operation status history file, cumulates the operation-status intervals included in the CPU operation status history record for each program identifier or each group of the plurality of predetermined program identifiers, and outputs a value, obtained by multiplying a ratio of the operation-status interval cumulated for each program identifier or each group of the plurality of predetermined program identifiers to a total of the operation-status intervals recorded by said CPU operation status obtaining step during the predetermined period and the operation time of the CPU during the operation period, as a CPU operation time required for execution of a program corresponding to the program identifier or to a program group corresponding to the plurality of predetermined program identifiers.

4. The operation report creation method according to claim 3, further comprising:

a conversion table updating step for updating, by said computer, a conversion table that indicates a relation between a total identifier which is a total unit for cumulating the operation-status intervals and the program identifier, wherein said operation report creation step cumulates the operation-status interval for each total identifier stored in said conversion table.

5. A program comprising computer executable instructions stored on a computer readable medium, said instructions being executable by a computing device to perform:

a CPU operation status obtaining process for obtaining, at a regular operation-status interval, an execution address at which a CPU is performing execution and for checking and recording a program identifier of a program in execution from the obtained execution address;

a CPU operation time obtaining process for obtaining an operation time of the CPU during an operation period; and an operation report creation process for outputting a value, obtained by multiplying a ratio of the total number of program identifiers for each program identifier or each group of the plurality of predetermined program identifiers to a total number of program identifiers recorded by said CPU operation status obtaining process for the predetermined period and the CPU operation time obtained by said CPU operation time obtaining process, as a CPU operation time required for execution of a program corresponding to the program identifier or of a program group corresponding to the plurality of predetermined program identifiers;

wherein said CPU operation status obtaining process records a CPU operation status history record into a CPU operation status history file, said record being composed of at least the program identifier of the program and the operation-status interval between a time a previous execution address was obtained and a time a current execution address is obtained, wherein said CPU operation time obtaining process obtains, at a regular operation-time interval, an operation time of the CPU during the operation-time interval and records a CPU operation time history record into a CPU operation time history file, said record being composed of at least the operation time of the CPU, and wherein said operation report creation process reads the CPU operation time history record stored in said CPU operation time history file, cumulates the operation time of the CPU included in the CPU operation time history record to calculate the operation time of the CPU during the operation period, reads the CPU operation status history record stored in said CPU operation status history file, cumulates the operation-status intervals included in the CPU operation status history record for each program identifier or each group of the plurality of predetermined program identifiers, and outputs a value, obtained by multiplying a ratio of the operation-status interval cumulated for each program identifier or each group of the plurality of predetermined program identifiers to a total of the operation-status intervals recorded by said CPU operation status obtaining process during the predetermined period and the operation time of the CPU during the operation period, as a CPU operation time required for execution of a program corresponding to the program identifier or to a program group corresponding to the plurality of predetermined program identifiers.

6. The program according to claim 5, further comprising:

a conversion table updating process for updating a conversion table that indicates a relation between a total identifier which is a total unit for cumulating the operation-status intervals and the program identifier, wherein said operation report creation process cumulates the operation-status interval for each total identifier stored in said conversion table.

* * * * *